United States Patent
Wu et al.

(10) Patent No.: US 9,674,908 B1
(45) Date of Patent: Jun. 6, 2017

(54) SECONDARY-SIDE BUCKING AND CURRENT-STABILIZING FLYBACK POWER CONVERTER

(71) Applicant: UNITY OPTO TECHNOLOGY CO., LTD., New Taipei (TW)

(72) Inventors: Chih-Hsien Wu, New Taipei (TW); Wei Chang, New Taipei (TW); Kai-Cheng Chuang, New Taipei (TW); Sheng-Wei Chen, New Taipei (TW); Che-Hao Kuo, New Taipei (TW)

(73) Assignee: Unity Opto Technology Co., Ltd., New Taipei (TW)

( * ) Notice: Subject to any disclaimer, the term of this patent is extended or adjusted under 35 U.S.C. 154(b) by 0 days.

(21) Appl. No.: 15/358,612

(22) Filed: Nov. 22, 2016

(30) Foreign Application Priority Data

Jul. 26, 2016 (TW) .............................. 105211247 U

(51) Int. Cl.
| | |
|---|---|
| *H05B 37/00* | (2006.01) |
| *H05B 33/08* | (2006.01) |
| *H02M 1/42* | (2007.01) |
| *H02M 1/14* | (2006.01) |
| *H02M 1/44* | (2007.01) |

(52) U.S. Cl.
CPC .......... *H05B 33/0815* (2013.01); *H02M 1/14* (2013.01); *H02M 1/42* (2013.01); *H02M 1/44* (2013.01)

(58) Field of Classification Search
CPC ...... H05B 33/0815; H02M 1/14; H02M 1/42; H02M 1/44
USPC ..................................... 315/200 R; 363/21.12
See application file for complete search history.

(56) References Cited

U.S. PATENT DOCUMENTS

| | | | |
|---|---|---|---|
| 6,674,271 B2 * | 1/2004 | Choo ................ | H02M 3/33561 323/282 |
| 2012/0147631 A1 * | 6/2012 | Nate ................. | H02M 3/33507 363/21.15 |

* cited by examiner

*Primary Examiner* — Daniel D Chang
(74) *Attorney, Agent, or Firm* — Rosenberg, Klein & Lee

(57) ABSTRACT

A secondary-side bucking and current-stabilizing flyback power converter adopts a dual-stage isolated circuit architecture and outputs a constant output current to drive a low-power LED module, and its primary stage adopts a flyback circuit architecture with a primary regulated voltage, and its secondary stage adopts of a buck circuit architecture of the current stabilizer, so that after the primary stage converts the constant voltage, the current stabilizer senses the load effect of the output current at the LED module to regulate the output cycle and maintain the total output of the output current constant and reduce the ripple amplitude, so as to achieve a non-strobe output result and improve the illumination effect of the LED module.

5 Claims, 4 Drawing Sheets

SECONDARY-SIDE BUCKING AND CURRENT-STABILIZING FLYBACK POWER CONVERTER

CROSS-REFERENCE TO RELATED APPLICATIONS

This non-provisional application claims priority under 35 U.S.C. §119(a) on Patent Application No(s). 105211247 filed in Taiwan, R.O.C. on Jul. 26, 2016, the entire contents of which are hereby incorporated by reference.

FIELD OF THE INVENTION

The present invention relates to the field of light emitting diodes (LED) lamps used in power equipments, and more particularly to a secondary-side bucking and current-stabilizing flyback power converter capable of outputting a constant current with a low ripple amplitude to overcome the strobe problems of the LED lamps by the concept of combining the control structure of a primary side regulation (PSR) voltage with the output structure of a secondary side regulation current.

BACKGROUND OF THE INVENTION

Description of the Related Art

Due to the physical properties of the popular LED light source, a power converter for converting alternate current (AC) into direct current (DC) is required to drive the operation of emitting light. In various types of power converters, a switching power supply (SPS) with the features of high efficiency, small volume, light weight, easy assembly and large output voltage range is used extensively in areas such as LCD devices, televisions or LED lamps, and the switching power supply generally includes boost, buck, fly-back, forward, and push-pull circuit architectures. Among these circuits, the fly-back circuits with the features of mature circuitry and easy multiple outputs are usually applied in LED lamps. Due to the power limitation of the application, a low power LED lamps generally adopts a single-stage converter, and a large power LED generally adopts a dual-stage converter.

With reference to FIG. for a power converter 1 adopting a single-stage flyback circuit architecture and using a pulse width modulation (PWM) control method to regulate and output an operating current (Io) to a plurality of LEDs 2, so that the LEDs 2 are operated at a constant current power to provide a stable illumination quality. However, such traditional power conversion circuit has the drawbacks of a low load adjustment precision, a strobe problem at the frequency of 120 Hz and the issue of electromagnetic interference (EMI), in addition to the relatively large ripple of the operating current.

Therefore, the power converter 1 as shown in FIG. 2 adopts a power factor (PF) correction dual-stage flyback circuit architecture, and its transformer 10 comprises a primary coil (NP), a secondary coil (NS) and an auxiliary coil (NA), and the primary coil is electrically coupled to a bridge rectifier 11, and the primary coil and the auxiliary coil are electrically coupled to a power factor control integrated circuit (PFC IC) 12. The secondary coil is electrically coupled to the LEDs 2 through an output inductor 13, and the secondary coil and the output inductor 13 are electrically coupled to a DC/DC control integrated circuit (DC/DC IC) 14, and the output inductor 13 is electrically coupled to the PFC IC 12 through an optical coupler 15. After the power converter 1 uses the transformer 10 to convert the input voltage rectified and outputted by the bridge rectifier 11, and the output inductor 13 converts and forms an operating voltage required by the LEDs 2. In the meantime, the power converter 1 uses the optical coupler 15, the DC/DC IC 14 and the PFC IC 12 to monitor an output voltage value of the operating voltage to control the operating cycle of the primary coil and affect the magnitude of the voltage value outputted by the secondary coil, so as to achieve the effect of stably outputting the operating voltage. However, such circuit architecture using the optical coupler 15 to achieve the electrical isolation and the secondary electric signal feedback control generally has the problems of using too many components and involving a large circuit and a low integration, and the optical coupler 15 has limitations in its application, since it may be worn out or damaged easily, and its performance is very unstable in a temperature change or an ageing process. In other words, such circuit architecture is very complicated and expensive, and thus it is not conducive to industrial development and application.

In view of the aforementioned drawbacks of the prior art, it is a main subject of the present invention to use the present existing electronic components to improve the circuit architecture of the isolated power converter and allow the circuit architecture to maintain the output current constant and stable without using any optical coupler to feed back the secondary load information, so as to achieve the non-strobe effect of the power converter, while providing a low-cost advantage and improve the economic effect.

SUMMARY OF THE INVENTION

Therefore, it is a primary objective of the present invention to overcome the drawbacks of the prior art by providing a secondary-side bucking and current-stabilizing flyback power converter, wherein the power convert is used in LED panel lights, LED downlights, or LED bulbs to overcome the strobe problem of illumination and prevent eye fatigue and eyesight damage.

To achieve the aforementioned and other objectives, the present invention discloses a secondary-side bucking and current-stabilizing flyback power converter adopting a dual-stage isolated circuit architecture, and provided for driving a low-power LED module to achieve the effect of a non-strobe output and improve the illumination effect of the LED module, comprising: an input module, electrically coupled to an external power supply, and provided for outputting an input current; a conversion module, adopting a flyback circuit architecture, and including a primary coil, a regulation coil, a regulator, an iron core and a secondary coil, and the primary coil and the regulation coil being installed at a primary side of the iron core, and the secondary coil being installed at a secondary side of the iron core, and the regulator being electrically coupled to the primary coil and the regulation coil, and the primary coil being electrically coupled to the input module, and the secondary coil forming an output voltage through the magnetic induction of the iron core after receiving the input current, while the regulation coil forming a regulation signal through the magnetic induction of the iron core and the regulation signal being provided for the regulator to regulate the duty cycle of the primary coil; and an output module, adopting a buck circuit architecture, and comprising a current stabilizer, and the output module being electrically coupled to the secondary coil and the LED module, and the output voltage being used to convert and form an output current to be outputted to the LED module, and the current stabilizer regulating the duty cycle of the output voltage of the sensed output current after the load effect of the LED module to keep the total output of the output current constant and reduce the ripple amplitude of the output current.

Wherein, the conversion module comprises a current stabilizing coil installed on the secondary side of the iron core, and the current stabilizing coil is electrically coupled to the output module and forms a constant current voltage through the magnetic induction of the iron core, and the constant current voltage is provided for the current stabilizer as a reference base for regulating the output voltage. The current stabilizer comprises a sensing element, and the sensing element is formed by at least two resistors connected in parallel with one another, and the sensing element senses the load effect of the LED module at the output current to form a sensed value, and drive the current stabilizer to regulate the duty cycle of the output voltage. The current stabilizer comprises a current stabilizing chip and a current stabilizing switch, and the current stabilizing chip is electrically coupled to the current stabilizing coil, and the current stabilizing switch and the sensing element are provided for receiving the constant current and voltage and regulating the duty cycle of the current stabilizing switch after comparing the sensed value, so as to correct the output cycle time of the output voltage to achieve a constant current effect. The regulator comprises a regulation chip, a regulation switch and a detecting element, and the detecting element is electrically coupled to the regulation coil and the regulation chip, and the regulation switch is electrically coupled to the regulation chip and the primary coil, and when the regulation coil magnetically induces the input current to obtain a regulated voltage, the detecting element detects the formed regulation signal and feeds the regulation signal back to the regulation chip, so that the regulation chip regulates the duty cycle of the regulation switch to correct the cycle period of the input current received by the primary coil, so as to achieve a voltage regulation effect.

In summation of the description above, the present invention uses a reverse way of thinking to apply the conventional flyback power conversion circuit and bucking power conversion circuit in LED lamps and use a primary stage PSR flyback circuit to stabilize the voltage, and then use the secondary side bucking circuit to maintain the output current constant, so as to reduce the ripple amplitude effectively and achieve the non-strobe effect of the illumination. Since the secondary side adopts a buck circuit architecture in the present invention, therefore the operating voltage of the circuit is lower, and the invention can adopt the present existing electronic components and control chip to achieve the effect of a low component cost and comply with the expectation of industrial and economic developments.

DESCRIPTION OF THE PREFERRED EMBODIMENTS

The above and other objects, features and advantages of this disclosure will become apparent from the following detailed description taken with the accompanying drawings.

Figure 1:
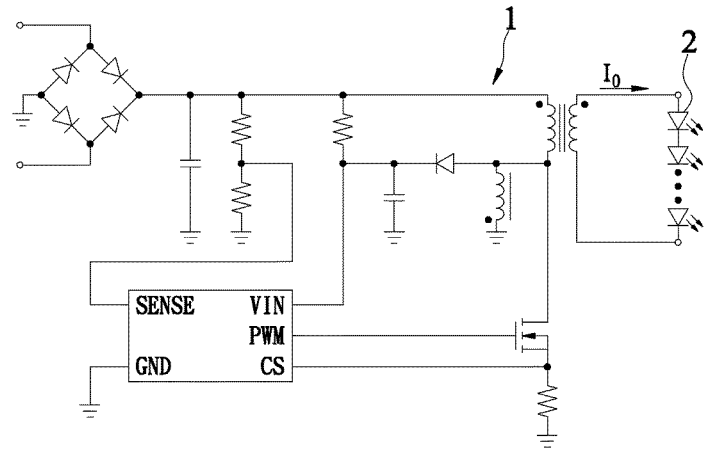
FIG. 1 is a circuit diagram of a conventional single-stage flyback power converter.
Figure 2:
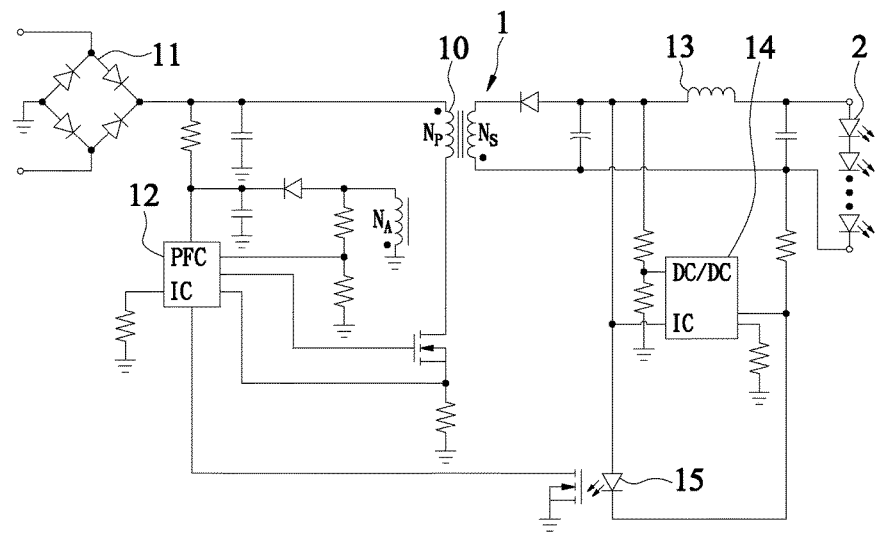
FIG. 2 is a circuit diagram of a conventional dual-stage flyback power converter.
Figure 3:
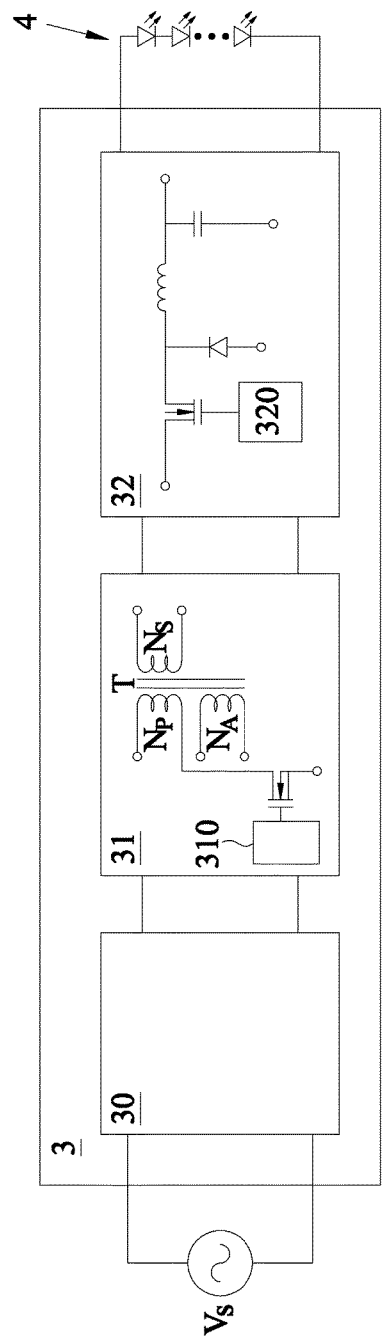
FIG. 3 is a block diagram of a preferred embodiment of the present invention.
Figure 4:
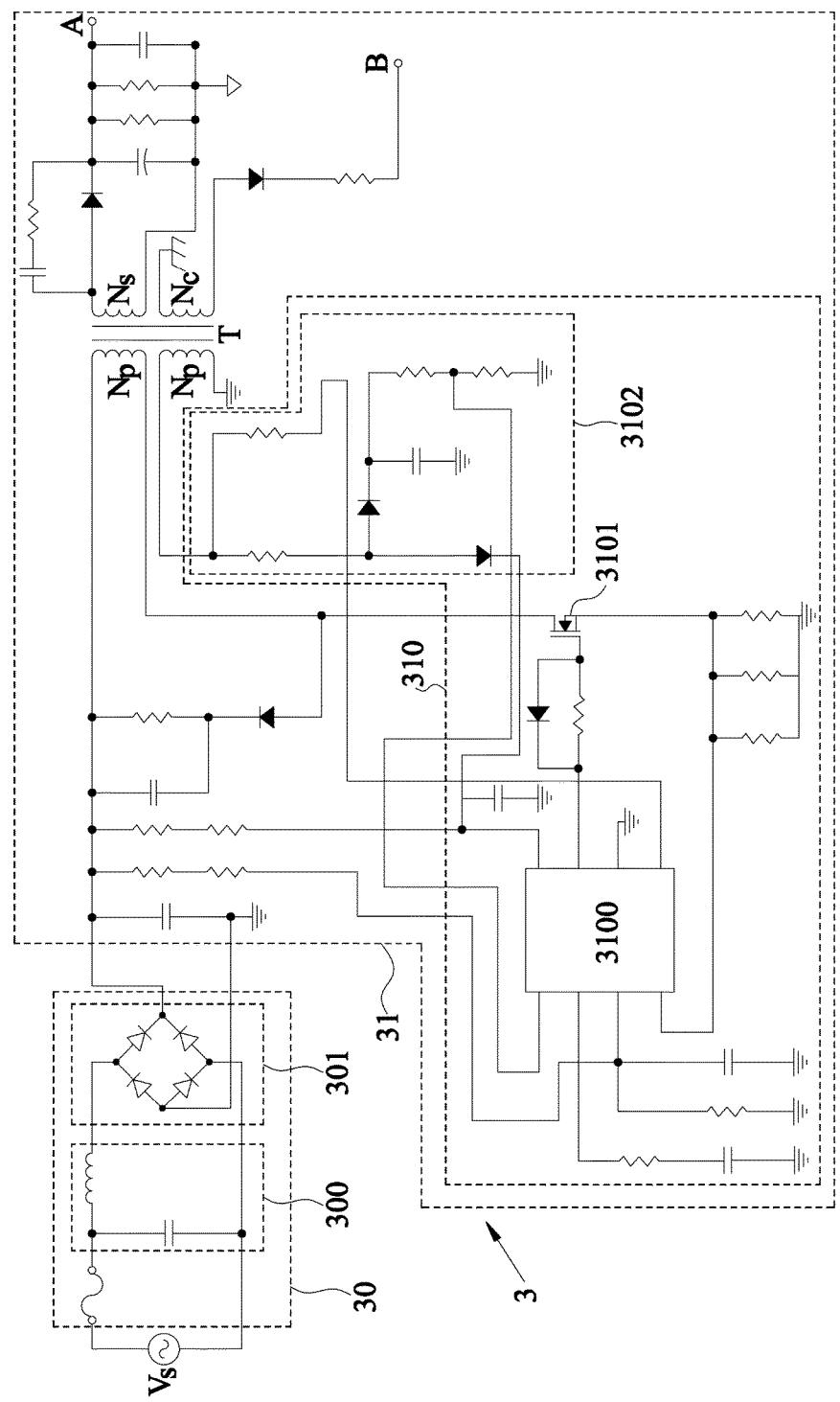
FIG. 4 is a circuit diagram (A) of a preferred embodiment of the present invention.
Figure 5:
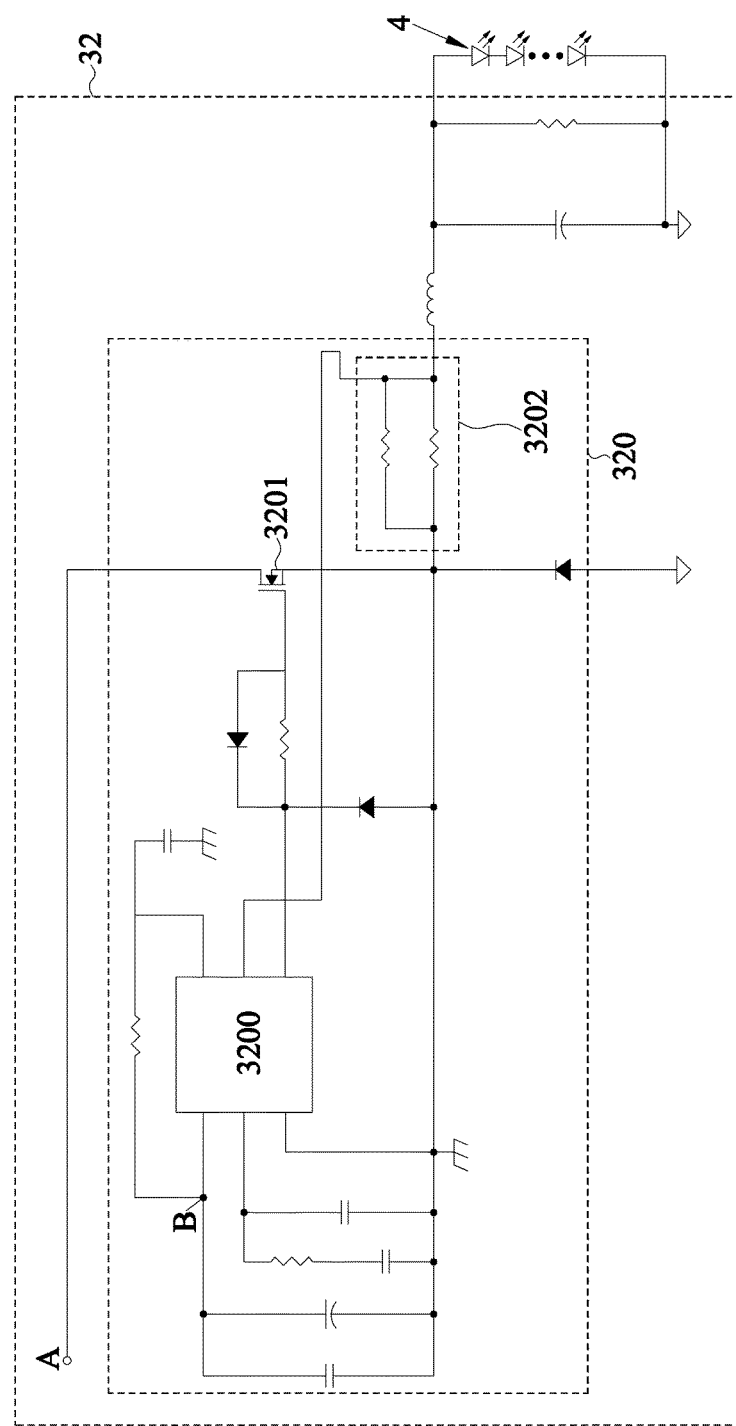
FIG. 5 is a circuit diagram (B) of a preferred embodiment of the present invention.

With reference to FIGS. 3 to 5 for the block diagram and circuit diagrams of a secondary-side bucking and current stabilizing flyback power converter in accordance with a preferred embodiment of the present invention, the secondary-side bucking and current stabilizing flyback power converter 3 adopts a dual-stage isolated circuit architecture, and the power converter 3 is provided for driving a low power LED module 4 to achieve a non-strobe output and improve the illumination effect of the LED module 4. The flyback power converter 3 comprises an input module 30, a conversion module 31 and an output module 32, and the input module 30 is electrically coupled to an external power supply (VS) and the conversion module 31, and the conversion module 31 adopts a flyback circuit architecture and is electrically coupled to the output module 32, and the output module 32 adopts a buck circuit architecture and is electrically coupled to the LED module 4. The input module 30 has an electromagnetic interference (EMI) device 300 and a bridge rectifier 301, and an end of the bridge rectifier 301 is electrically coupled to an external power supply through the EMI device 300 for receiving an alternate current (AC), and the other end of the bridge rectifier 301 is electrically coupled to the conversion module 31 and provided for rectifying the AC to form an input current to be outputted to the conversion module 31.

The conversion module 31 comprises a primary coil (NP), a secondary coil (NS), a regulation coil (NA), a current stabilizing coil (NC), an iron core (T) and a regulator 310, and the regulator 310 has a regulation chip 3100, a regulation switch 3101 and a detecting element 3102. The primary coil and the regulation coil are installed on the primary side of the iron core, and the secondary coil and the current stabilizing coil are installed on the secondary side of the iron core, and the primary coil is electrically coupled to the bridge rectifier 301, the regulation chip 3100 and the regulation switch 3101, and the regulation chip 3100 is electrically coupled to the regulation switch 3101 and the detecting element 3102, and the detecting element 3102 is electrically coupled to the regulation coil, and the secondary coil and the current stabilizing coil are electrically coupled to the output module 32. After the primary coil receives the input current, the secondary coil magnetically induces and forms an output voltage through the iron core, and the output module 32 receives and converts the output voltage to form an output current to be outputted to the LED module 4, so as to drive the LED module 4 to emit light. In addition, the regulation coil forms a regulated voltage through the magnetic induction of the iron core, and after the detecting element 3102 receives the regulated voltage and detects and forms the regulation signal, the regulation signal is fed back to the regulation chip 3100, so that the regulation chip 3100 adjusts the duty cycle of the regulation switch 3101 and regulates the cycle time of the input current received by the primary coil, so as to affect the magnitude of the output voltage formed by the magnetic induction of the secondary coil, so as to achieve the effect of stabilizing the voltage. In the meantime, the current stabilizing coil forms a constant current voltage through the magnetic induction of the iron core.

The output module 32 has a built-in current stabilizer 320, and the current stabilizer 320 comprises a current stabilizing chip 3200, a current stabilizing switch 3201, and a sensing element 3202, and the sensing element 3202 is formed by at least two resistors coupled in parallel with each other. The current stabilizing chip 3200 is electrically coupled to the current stabilizing coil for receiving the constant current voltage, and the current stabilizing switch 3201 is electrically coupled to the secondary coil, the current stabilizing chip 3200 and the sensing element 3202, and the sensing element 3202 is electrically coupled to the LED module 4. The current stabilizer 32 uses the sensing element 3202 to sense the load effect of the output current at the LED module 4 to form a sensed value to be fed back to the current stabilizing chip 3200, and the current stabilizing chip 3200 uses the constant current voltage as a reference base to compare the sensed value and adjust the duty cycle of the current stabilizing switch 3201 and change the cycle time of the output voltage received by the output module 32, so as to maintain the total output of the output current constant and achieve the effects of maintaining a constant current and reducing the ripple amplitude of the output current. Therefore, the actual test results are listed in the following table. If the AC voltage of the external power supply is 90~277 volts (V), the power PF of flyback power converter 3 is 0.9 or greater, and the overall power conversion efficiency is over 85% and the peak current Vmax is just 1.03 times of the actual measured current Vrms. Compared with the prior art having a ripple amplitude of 1.3~1.6 times, the peak current Vmax of the invention is much smaller, and the invention surely achieves the non-strobe effect.

the regulator being electrically coupled to the primary coil and the regulation coil, and the primary coil being electrically coupled to the input module, and the secondary coil forming an output voltage through the magnetic induction of the iron core after receiving the input current, while the regulation coil forming a regulation signal through the magnetic induction of the iron core and the regulation signal being provided for the regulator to regulate the duty cycle of the primary coil; and an output module, adopting a buck circuit architecture, and comprising a current stabilizer, and the output module being electrically coupled to the secondary coil and the LED module, and the output voltage being used to convert and form an output current to be outputted to the LED module, and the current stabilizer regulating the duty cycle of the output voltage after sensing the load effect of the output current on the LED module to keep the total output of the output current constant and reduce the ripple amplitude of the output current.

2. The secondary-side bucking and current-stabilizing flyback power converter according to claim 1, wherein the conversion module comprises a current stabilizing coil installed on the secondary side of the iron core, and the current stabilizing coil is electrically coupled to the output module and forms a constant current voltage through the magnetic induction of the iron core, and the constant current voltage is provided for the current stabilizer as a reference base for regulating the output voltage.

| Vac (V) | Freq (Hz) | AC Iin (mA) | PF | Pin (W) | Vrms (V) | Vmax (V) | Magnification | Vout-rms (V) | Light Panel Watts (W) | Efficiency (%) |
|---|---|---|---|---|---|---|---|---|---|---|
| 90  | 60 | 160  | 0.987 | 14.37 | 254 | 263 | 1.035 | 48.2 | 12.2428 | 85.2% |
| 100 | 60 | 143  | 0.984 | 14.14 | 253 | 261 | 1.032 | 48   | 12.144  | 85.9% |
| 110 | 60 | 129  | 0.982 | 14.03 | 253 | 261 | 1.032 | 47.8 | 12.0934 | 86.2% |
| 120 | 60 | 118  | 0.98  | 13.91 | 253 | 262 | 1.036 | 47.8 | 12.0934 | 86.9% |
| 132 | 60 | 107  | 0.977 | 13.86 | 253 | 262 | 1.036 | 47.8 | 12.0934 | 87.3% |
| 150 | 60 | 94.6 | 0.969 | 13.8  | 253 | 262 | 1.036 | 47.7 | 12.0681 | 87.5% |
| 160 | 60 | 88.4 | 0.967 | 13.77 | 252 | 261 | 1.036 | 47.7 | 12.0204 | 87.3% |
| 170 | 60 | 83.2 | 0.967 | 13.74 | 252 | 261 | 1.036 | 47.7 | 12.0204 | 87.5% |
| 180 | 60 | 79   | 0.962 | 13.74 | 252 | 261 | 1.036 | 47.6 | 11.9952 | 87.3% |
| 190 | 60 | 75.4 | 0.954 | 13.73 | 252 | 261 | 1.036 | 47.6 | 11.9952 | 87.4% |
| 200 | 50 | 71.9 | 0.954 | 13.79 | 252 | 260 | 1.032 | 47.7 | 12.0204 | 87.2% |
| 210 | 50 | 69   | 0.947 | 13.78 | 252 | 261 | 1.036 | 47.7 | 12.0204 | 87.2% |
| 220 | 50 | 66.4 | 0.941 | 13.79 | 252 | 260 | 1.032 | 47.6 | 11.9952 | 87%   |
| 230 | 50 | 64.1 | 0.932 | 13.78 | 252 | 260 | 1.032 | 47.6 | 11.9952 | 87%   |
| 240 | 50 | 61.9 | 0.926 | 13.81 | 252 | 261 | 1.036 | 47.6 | 11.9952 | 86.9% |
| 250 | 50 | 60   | 0.918 | 13.82 | 252 | 261 | 1.036 | 47.6 | 11.9952 | 86.8% |
| 264 | 50 | 57.8 | 0.903 | 13.84 | 252 | 261 | 1.036 | 47.5 | 11.97   | 86.5% |
|     |    |      |       |       |     |     |       |      |         | 87.5% |

What is claimed is:

1. A secondary-side bucking and current-stabilizing flyback power converter, adopting a dual-stage isolated circuit architecture, and provided for driving a low-power LED module to achieve the effect of a non-strobe output and improve the illumination effect of the LED module, comprising:

an input module, electrically coupled to an external power supply, and provided for outputting an input current;

a conversion module, adopting a flyback circuit architecture, and including a primary coil, a regulation coil, a regulator, an iron core and a secondary coil, and the primary coil and the regulation coil being installed at a primary side of the iron core, and the secondary coil being installed at a secondary side of the iron core, and 3. The secondary-side bucking and current-stabilizing flyback power converter according to claim 2, wherein the current stabilizer comprises a sensing element, and the sensing element is formed by at least two resistors connected in parallel with one another, and the sensing element senses the load effect of the LED module of the output current to form a sensed value, and drive the current stabilizer to regulate the duty cycle of the output voltage.

4. The secondary-side bucking and current-stabilizing flyback power converter according to claim 3, wherein the current stabilizer comprises a current stabilizing chip and a current stabilizing switch, and the current stabilizing chip is electrically coupled to the current stabilizing coil, the current stabilizing switch and the sensing element for receiving the constant current and voltage and regulating the duty cycle of the current stabilizing switch after comparing the sensed value, so as to correct the output cycle time of the output voltage to achieve a constant current effect.

5. The secondary-side bucking and current-stabilizing flyback power converter according to claim 4, wherein the regulator comprises a regulation chip, a regulation switch and a detecting element, and the detecting element is electrically coupled to the regulation coil and the regulation chip, and the regulation switch is electrically coupled to the regulation chip and the primary coil, and when the regulation coil magnetically induced by the input current to obtain a regulated voltage, the detecting element detects and forms the regulation signal and feeds the regulation signal back to the regulation chip, so that the regulation chip regulates the duty cycle of the regulation switch to correct the cycle period of the input current received by the primary coil, so as to achieve a voltage regulation effect.

* * * * *